US012341205B2

(12) United States Patent
Inoue

(10) Patent No.: US 12,341,205 B2
(45) Date of Patent: Jun. 24, 2025

(54) ALKALINE BUTTON CELL

(71) Applicant: Maxell, Ltd., Kyoto (JP)

(72) Inventor: Yusuke Inoue, Kyoto (JP)

(73) Assignee: MAXELL, LTD., Kyoto (JP)

( * ) Notice: Subject to any disclaimer, the term of this patent is extended or adjusted under 35 U.S.C. 154(b) by 270 days.

(21) Appl. No.: 18/014,405

(22) PCT Filed: Jul. 9, 2021

(86) PCT No.: PCT/JP2021/025876
§ 371 (c)(1),
(2) Date: Jan. 4, 2023

(87) PCT Pub. No.: WO2022/009967
PCT Pub. Date: Jan. 13, 2022

(65) Prior Publication Data
US 2023/0261296 A1 Aug. 17, 2023

(30) Foreign Application Priority Data
Jul. 9, 2020 (JP) ................................ 2020-118434

(51) Int. Cl.
*H01M 50/193* (2021.01)
*H01M 4/06* (2006.01)
(Continued)

(52) U.S. Cl.
CPC ........... *H01M 50/193* (2021.01); *H01M 4/06* (2013.01); *H01M 4/244* (2013.01); *H01M 4/38* (2013.01);
(Continued)

(58) Field of Classification Search
CPC .......... H01M 4/244; H01M 4/34; H01M 4/06; H01M 4/38; H01M 4/663; H01M 50/109; H01M 6/045; H01M 2300/0014
See application file for complete search history.

(56) References Cited

U.S. PATENT DOCUMENTS 5,569,564 A * 10/1996 Swierbut ................ H01M 4/50 429/224
6,586,139 B1 7/2003 Watanabe et al.
(Continued)

FOREIGN PATENT DOCUMENTS

EP 0 582 293 A2 2/1994
EP 3419077 A1 12/2018
(Continued)

OTHER PUBLICATIONS

International Search Report dated Oct. 5, 2021, issued in counterpart International Application No. PCT/JP2021/025876 (2 pages).
(Continued)

*Primary Examiner* — Sean P Cullen
*Assistant Examiner* — Kimberly Wyluda
(74) *Attorney, Agent, or Firm* — WHDA, LLP

(57) ABSTRACT

Provided is a highly reliable button-shaped alkaline battery having excellent load characteristics. A button-shaped alkaline battery includes: a positive electrode having a positive electrode mixture layer containing a silver oxide and a conductive assistant; a negative electrode containing zinc particles; an alkaline electrolyte solution; and a battery container for accommodating the positive electrode, the negative electrode, and the alkaline electrolyte solution, the battery container including an outer can, a sealing plate, and a resin gasket. The positive electrode mixture layer contains carbon black and graphite particles as the conductive assistant, and an amount of water in the battery container is 0.63 to 1 g per 1 g of the zinc particles of the negative electrode.

2 Claims, 1 Drawing Sheet

(51) Int. Cl.

| | |
|---|---|
| ***H01M 4/24*** | (2006.01) |
| ***H01M 4/34*** | (2006.01) |
| ***H01M 4/38*** | (2006.01) |
| ***H01M 4/66*** | (2006.01) |
| ***H01M 6/04*** | (2006.01) |
| ***H01M 50/109*** | (2021.01) |
| ***H01M 50/128*** | (2021.01) |

(52) U.S. Cl.
CPC ........... *H01M 4/663* (2013.01); *H01M 6/045* (2013.01); *H01M 50/109* (2021.01); *H01M 50/128* (2021.01); *H01M 4/34* (2013.01); *H01M 2300/0014* (2013.01)

(56) References Cited

U.S. PATENT DOCUMENTS

| | | | | |
|---|---|---|---|---|
| 6,723,469 | B1 | 4/2004 | Watanabe et al. | |
| 2003/0207173 | A1 * | 11/2003 | Wang ...................... | H01M 4/54 429/219 |
| 2004/0197656 | A1 * | 10/2004 | Durkot .................. | H01M 4/366 429/223 |
| 2006/0003225 | A1 | 1/2006 | Okubo et al. | |
| 2007/0292762 | A1 | 12/2007 | Johnson | |
| 2012/0129044 | A1 | 5/2012 | Johnson | |
| 2020/0014039 | A1 | 1/2020 | Takahashi et al. | |

FOREIGN PATENT DOCUMENTS

| | | | |
|---|---|---|---|
| JP | 7-6759 | A | 1/1995 |
| JP | 2006-19092 | A | 1/2006 |
| JP | 2009-541936 | A | 11/2009 |
| JP | 2010-218710 | A | 9/2010 |
| JP | 2010-218711 | A | 9/2010 |
| WO | 2007/149309 | A1 | 12/2007 |
| WO | 2018/163485 | A1 | 9/2018 |

OTHER PUBLICATIONS

Extended Supplementary European Search Report dated Jun. 28, 2024, issued in counterpart Application No. 21838005.3. (4 pages).
Office Action dated Jul. 26, 2024, issued in counterpart EP Application No. 21838005.3. (6 pages).

* cited by examiner

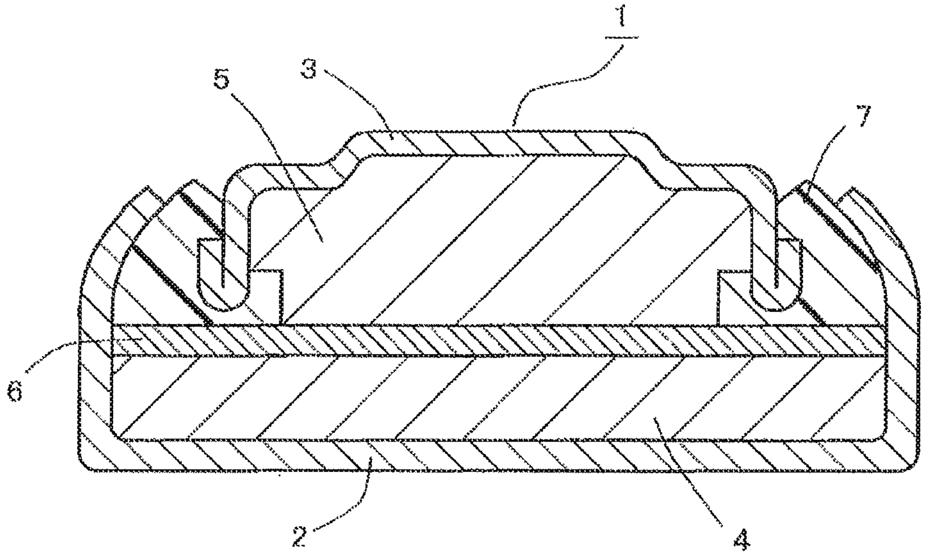
1
3
5
7
6
2
4

ALKALINE BUTTON CELL

TECHNICAL FIELD

The present invention relates to a highly reliable alkaline battery having excellent load characteristics.

BACKGROUND ART

Alkaline batteries (silver oxide batteries) including a positive electrode containing a silver oxide and an alkaline electrolyte solution are widely and commonly used as primary batteries.

The batteries of this type have been studied from various aspects to improve the properties. For example, Patent Document 1 discloses a flat silver oxide battery whose amount of water in the battery system is adjusted to 0.42 to 0.55 g per 1 g of zinc particles or zinc alloy particles of a negative electrode to facilitate discharge reactions and improve load characteristics.

Further, Patent Document 2 discloses a flat, silver oxide battery whose content of a conductive assistant in a positive electrode mixture is adjusted to 3 to 7% by mass and density of a positive electrode mixture molded body is adjusted to 5.0 to 7.0 g/cm$^3$ to increase the conductivity in the positive electrode mixture and improve the load characteristics of the battery without decreasing the capacity of the battery.

The flat silver oxide batteries disclosed by Patent Documents 1 and 2 can reduce internal resistance, thereby improving the load characteristics to some extent.

PRIOR ART DOCUMENTS

Patent Documents

Patent Document 1: JP 2010-218711 A
Patent Document 2: JP 2010-218710 A

DISCLOSURE OF INVENTION

Problem to be Solved by the Invention

For medical applications, batteries are required to have a further improved output, and button-shaped alkaline batteries satisfying this requirement are also under development. Attempts have been made to improve the output by, for example, further increasing the amount of the electrolyte solution and the content of the conductive assistant in the positive electrode mixture.

However, if the amount of water in the battery is increased above the range described in Patent Document 1, the electrolyte solution tends to leak. Particularly when the amount of the zinc particles filled inside the sealing plate is increased in battery assembly to improve the discharge capacity, the airspace in the battery container decreases, and the leakage is more likely to occur.

Moreover, even if the content of the conductive assistant, such as graphite, in the positive electrode mixture is increased above the range described in Patent Document 2, the load characteristics are not always improved, and the decreased proportion of the positive electrode active material may degrade the load characteristics. Thus, further studies are essential to improve the battery output.

With the foregoing in mind, the present invention provides a highly reliable button-shaped alkaline battery having excellent load characteristics.

Means for Solving Problem

A button-shaped alkaline battery of the present invention includes: a positive electrode having a positive electrode mixture layer containing a silver oxide and a conductive assistant; a negative electrode containing zinc particles; an alkaline electrolyte solution; and a battery container for accommodating the positive electrode, the negative electrode, and the alkaline electrolyte solution, the battery container including an outer can, a sealing plate, and a resin gasket. The positive electrode mixture layer contains carbon black and graphite particles as the conductive assistant, and an amount of water in the battery container is 0.63 to 1 g per 1 g of the zinc particles of the negative electrode.

Effect of the Invention

The present invention provides a highly reliable button-shaped alkaline battery having excellent load characteristics.

BRIEF DESCRIPTION OF DRAWING

FIG. 1 is a vertical cross-sectional view schematically illustrating an exemplary button-shaped alkaline battery of the present invention.

DESCRIPTION OF THE INVENTION

FIG. 1 is a vertical cross-sectional view schematically illustrating an exemplary button-shaped alkaline battery of the present invention. In a button-shaped alkaline battery 1 shown in FIG. 1, a positive electrode 4 and a separator 6 are provided in an outer can 2. A negative electrode 5 is provided in a sealing plate 3. The sealing plate 3 is fitted into the opening of the outer can 2 via an annular resin gasket 7 having an L-shaped cross section. The opening edge of the outer can 2 is tightened inward, which brings the resin gasket 7 into contact with the sealing plate 3. Thus, the opening of the outer can 2 is sealed to form a closed structure in the battery. In other words, the button-shaped alkaline battery 1 shown in FIG. 1 is configured such that power generation components including the positive electrode 4, the negative electrode 5, and the separator 8 are placed in the space (closed space) of a battery container including the outer can 2, the sealing plate 3, and the resin gasket 7. Moreover, an alkaline electrolyte solution (not shown) is contained in the space. The outer can 2 also serves as a positive electrode terminal, and the sealing plate 3 also serves as a negative electrode terminal.

Moreover, in the button-shaped alkaline battery 1 shown in FIG. 1, the peripheral portion of the positive electrode 4 is situated between the inner bottom face of the outer can 2 and the bottom face of the gasket 7.

Hereinafter, the configuration of the button-shaped alkaline battery of the present invention will be described in detail.

<Negative Electrode>

The negative electrode of the present invention contains zinc particles, and the zinc in the particles acts as an active material of the negative electrode. In order to prevent generation of hydrogen gas from the negative electrode in the battery, it is desired that the zinc particles contain one or more elements including indium, bismuth, aluminum, and magnesium.

The proportion of the elements contained in the zinc particles is preferably 0.03% by mass or more for indium, 0.02% by mass or more for bismuth, 0.0005% by mass or more for aluminum, and 0.0002% by mass or more for magnesium.

An excessively high proportion of the elements in the zinc particles tends to cause problems such as degradation in the discharge characteristics of the battery and an increase in the amount of hydrogen gas to be generated. Therefore, the proportion of the elements contained in the zinc particles is preferably 0.07% by mass or less for indium, 0.06% by mass or less for bismuth, 0.01% by mass or less for aluminum, and 0.003% by mass or less for magnesium.

Typically, zinc particles to be used are free of toxic elements such as mercury and lead from the viewpoint of environmental friendliness.

Regarding the particle size of the zinc particles, for example, the proportion of the particles having a particle size of 75 μm or less is preferably 25% by mass or less, more preferably 20% by mass or less, and particularly preferably 10% by mass or less in the total powder. Moreover, the proportion of the particles having a particle size of larger than 75 μm and 150 μm or less is preferably 50% by mass or more, more preferably 70% by mass or more, and particularly preferably 90% by mass or more in the total powder.

The particle size of the zinc particles can be measured based on the proportion of particles passing through a 75 μm mesh sieve (No. 200 mesh sieve), the proportion of particles not passing through the 75 μm mesh sieve but passing through a 150 μm mesh sieve (No. 100 mesh sieve), and the proportion of particles not passing through the 150 μm mesh sieve (these proportions are 100% by mass in total).

The negative electrode is formed using a mixture of the zinc particles and an alkaline electrolyte solution. The mixture for the negative electrode may further contain a gelling agent such as sodium polyacrylate or carboxymethyl cellulose as appropriate.

<Amount of Water in Battery Container>

In the button-shaped alkaline battery of the present invention, from the viewpoint of minimizing factors that, inhibit battery reactions to reduce the internal resistance of the battery and improve the load characteristics, the composition and the amount of the electrolyte solution, etc., are adjusted so that the amount of water in the battery container, i.e., the mass of water contained in the whole electrolyte solution in the battery system, including the electrolyte solution contained in the constituent elements such as the negative electrode, the positive electrode, and the separator, becomes 0.63 g or more per 1 g of the zinc particles of the negative electrode. In order to further improve the load characteristics, the amount of water in the battery container is preferably 0.7 g or more, and more preferably 0.8 g or more per 1 g of the zinc particles of the negative electrode.

An excess amount of water in the battery container tends to cause a liquid leakage during storage of the battery and an overflow of the electrolyte solution from the container during injection of the electrolyte solution into the container or during sealing of the container in battery assembly, which may result in an assembly failure. From this viewpoint, the amount of water in the battery container needs to be 1 g or less, preferably 0.95 g or less, and more preferably 0.9 g or less per 1 g of the zinc particles of the negative electrode.

When water held by the constituent elements, e.g., water adsorbed by the constituent elements, including a positive electrode active material, the negative electrode active material, a binder, and the separator, is in a negligible amount, the amount of water in the electrolyte solution used for battery assembly may be assumed as the amount of water in the battery container.

In order to determine the amount of water in the battery container of the assembled battery, it may be calculated, for example, by disassembling the battery, drying the battery for 12 hours at 110° C. in a vacuum to evaporate water in the battery container, and subtracting the mass of the battery after drying from the mass of the battery before drying. The amount of water in the battery container indicated in examples discussed below is a value obtained by calculating the amount of water in the electrolyte solution by the former method.

<Alkaline Electrolyte Solution>

The button-shaped alkaline battery of the present invention uses an alkaline aqueous solution as the electrolyte solution. The electrolyte to be contained is preferably an alkali metal hydroxide (e.g., sodium hydroxide, potassium hydroxide, and lithium hydroxide), and particularly preferably potassium hydroxide. As to the concentration of the electrolyte solution in the case of using, e.g., an aqueous solution of potassium hydroxide, the concentration of potassium hydroxide is preferably 20% by mass or more, and more preferably 28% by mass or more. On the other hand, the concentration of potassium hydroxide is preferably 40% by mass or less and more preferably 35% by mass or less to enhance ion conductivity. By adjusting the concentration of the aqueous solution of potassium hydroxide to the above range, it is possible to configure a battery having further improved load characteristics.

In addition to the above components, the electrolyte solution may contain various known additives as appropriate to the extent that they do not inhibit the effects of the present invention. For example, zinc oxide, tin oxide, indium oxide, or the like, may be added to the electrolyte solution to prevent the corrosion (oxidation) of the zinc particles.

<Positive Electrode>

The positive electrode of the present invention is composed using a molded body (positive electrode mixture layer) that is produced through pressure molding of a positive electrode mixture containing at least a silver oxide (e.g., silver(I) oxide, silver(II) oxide, silver-nickel complex oxide) as the positive electrode active material and a conductive assistant.

The silver oxide for the positive electrode is preferably granular. The silver oxide is usually in the form of fine powder having a particle size of 0.1 to 5 μm. By granulating the silver oxide powder, the resistance is lowered as compared with the case of using the silver oxide in the form of fine powder, and thus the load characteristics of the battery can be improved further.

In the case of using the silver oxide in the form of fine powder, a larger amount of the conductive assistant is necessary to reduce the resistance, resulting in a capacity drop. By using the granular silver oxide, weighability is improved and variations in the weight of the positive electrode are reduced; besides, filling properties and moldability are improved in pressure molding, and thus the resistance is lowered while reducing variations in the properties between batteries. Moreover, the granular silver oxide can reduce the amount of a carbonaceous material or the like to be added as the conductive assistant, and thus a necessary capacity can be provided.

When the granular silver oxide is used, the particle size is preferably 50 μm or more, and more preferably 75 μm or more, and preferably 500 μm or less, and more preferably 300 μm or less. The bulk density is preferably 1.5 $g/cm^3$ or more, and more preferably 1.8 g/cm$^3$ or more, and preferably 3.5 g/cm$^3$ or less, and more preferably 2.6 g/cm$^3$ or less. The silver oxide in the form of granules has better mobility than that in the powder form, and thus improving the weighability and moldability as describes above and lowering the resistance and increasing reactivity. This further improves the load characteristics of the battery and reduces the variations in the properties between batteries. The particle size of the granular silver oxide as used herein refers to a value measured with a laser diffraction-scattering particle size distribution (grain size distribution) analyzer. The bulk density of the granular silver oxide refers to a value determined according to test methods for bulk density specified in JIS R 1628, by placing a predetermined amount of the granular silver oxide in a container and measuring the bulk density with a bulb density measuring device.

The positive electrode may further contain other active materials in addition to the silver oxide. Manganese dioxide, nickel oxyhydroxide, etc., can be mixed with the silver oxide.

The positive electrode of the present invention contains carbon black and graphite particles as the conductive assistant. The use of these carbonaceous particles in combination with the silver oxide forms a positive electrode mixture layer having an appropriate density, whereby the positive electrode mixture layer can easily absorb and hold the electrolyte solution, and thus preventing the liquid leakage and the assembly failure even when a larger amount of water is used in the battery container while enhancing the conductivity of the positive electrode and improving the load characteristics of the battery.

The density of the positive electrode mixture layer is preferably 5.2 g/cm$^3$ or more to enhance the conductivity, whereas the density thereof is preferably 5.5 g/cm$^3$ or less to allow the layer to easily absorb and hold the electrolyte solution.

Examples of the carbon black include furnace black, channel black, acetylene black, and thermal black. Acetylene black having high conductivity and fewer impurities is preferably used. The carbon black to be used has a BET specific surface area of preferably 85 m$^2$/g or less to reduce the generation of gas due to surface functional groups, impurities, or the like. On the other hand, in order to form a good conduction network, the BET specific surface area of the carbon black is preferably 15 m$^2$/g or more.

The average particle size of the graphite particles is preferably 1 μm or more to improve the moldability of the positive electrode mixture layer, whereas the average particle size thereof is preferably 7 μm or less to improve the conductivity. The ratio between the carbon black and the graphite particles preferably ranges from 20:80 to 50:50 at a mass ratio.

The proportion of the conductive assistant contained in the positive electrode mixture layer is preferably 4% by mass or more to enhance the conductivity of the positive electrode, whereas the proportion thereof is preferably 8% by mass or less to increase the discharge capacity by raising the proportion of the positive electrode active material. The positive electrode mixture layer may contain other conductive assistants (e.g., carbon fibers) in addition to the carbon black and the graphite particles, or may contain only the carbon black and the graphite particles.

The positive electrode may be produced, for example, by preparing a positive electrode mixture by mixing the positive electrode active material, the conductive assistant, the alkaline electrolyte solution, and the like, and molding the positive electrode mixture into a predetermined shape under pressure.

The liquid leakage during assembly or storage of the battery can be prevented by decreasing the filling amount of the negative electrode active material or the positive electrode active material to increase the airspace in the battery container. However, the decrease in the mass of the active material results in a decrease in the capacity of the battery. It is desired that even when a certain amount or a larger amount of the active material is filled in the airspace, i.e., the airspace in the battery container is narrow, the battery can exhibit excellent load characteristics while containing the above range of water in the battery container.

In the present invention, far example, assuming that a (μL) represents the internal capacity of the sealing plate in a state in which the resin gasket is attached thereto (the volume of the airspace in which the zinc particles are fillable), and b (mg) represents the mass of the zinc particles filled inside the sealing plate, and when the battery satisfies a value of b/a of 1 or more, i.e., the zinc particles accounts for 14% or more of the internal capacity of the sealing plate, the battery of the present invention can prevent problems such as the liquid leakage and the assembly failure with the above range of water in the battery container while exhibiting excellent load characteristics.

Here, "the internal capacity of the sealing plate in a state in which the resin gasket is attached thereto" refers to a spatial capacity formed between the inner bottom face of the sealing plate and the opening edge of the gasket".

Moreover, in the present invention, under conditions that the side face of the positive electrode mixture layer is in contact with the inner side face of the outer can, i.e., in the sealed state, and airspace formed between the positive electrode mixture layer and the outer can is substantially not present or present but limited to an area between the bottom face of the positive electrode mixture layer and the inner bottom face of the outer can, and the positive electrode mixture layer accounts for, e.g., 78% of more of the internal capacity of the outer can in the battery container, the battery of the present invention can prevent problems such as the liquid leakage and the assembly failure with the above range of water in the battery container while exhibiting excellent load characteristics.

The value of b/a is preferably 1.1 or more, and more preferably 1.15 or more to increase the discharge capacity of the battery. On the other hand, the value of b/a is preferably 2 or less, and more preferably 1.5 or less to leave appropriate airspace inside the sealing plate for volumetric expansion of the negative electrode due to zinc oxide formed by discharging of the zinc particles.

In order to increase the discharge capacity of the battery, the positive electrode mixture layer preferably accounts for 82% or more, and more preferably 85% or more of the internal capacity of the outer can in the battery container. On the other hand, in order to leave airspace for accommodating a separator and the like, the positive electrode mixture layer preferably accounts for 97% or less, and more preferably 94% or less of the internal capacity of the outer can.

Here, "the internal capacity of the outer can in the battery container" refers to a spatial capacity formed from the inner bottom face of the outer can to the bottom face and the opening edge of the gasket".

The separator according to the button-shaped alkaline battery of the present invention is not particularly limited, and examples thereof include the following: a nonwoven fabric mainly composed of vinylon and rayon; a vinylon-rayon nonwoven fabric (vinylon-rayon mixed paper); a polyimide nonwoven fabric; polyolefin-rayon nonwoven fabric; vinylon paper; vinylon-linter pulp paper; vinylon-mercerized pulp paper; and a graft film composed of a graft copolymer obtained by graft copolymerization of acrylic acid with a polyethylene main chain. Moreover, the separator may be a laminate of a hydrophilic microporous polyolefin film (such as a microporous polyethylene film or a microporous polypropylene film), a cellophane film, and a liquid-absorbing layer such as vinylon-rayon mixed paper.

The outer can of the button-shaped alkaline battery may be of, e.g., nickel-plated iron or stainless steel. The sealing plate may be of, e.g., iron or stainless steel whose inner face is a metal layer made of copper or a copper alloy such as brass. It is more preferable to further form a tin layer on the surface of the metal layer. The reason for forming the metal layer made of copper or a copper alloy on the inner face of the sealing plate is for anticorrosion of zinc by preventing the formation of a local battery with zinc, and further forming the tin layer on the surface of the metal layer can enhance the anticorrosion effect.

The outer can and the sealing plate are sealed with a gasket interposed therebetween, and thus the button-shaped alkaline battery is assembled. The material for the gasket may be a resin that is tolerant of an alkaline aqueous solution such as polypropylene or nylon.

EXAMPLES

Hereinafter, the present invention will be described in detail by way of examples. However, the present invention is not limited to the following examples.

Example 1

<Preparation of Positive Electrode>

A positive electrode mixture molded body (positive electrode mixture layer) was formed in the following manner. A mixture was prepared by mixing 94.3 parts by mass of granulated silver(I) oxide having an average particle size of 150 μm and a bulk density of 2.4 g/cm$^3$ as a positive electrode active material, 1.9 parts by mass of acetylene black particles having a BET specific surface area of 68 m$^2$/g and an average particle size of primary particles of 35 nm, and 3.8 parts by mass of graphite particles having a BET specific surface area of 20 m$^2$/g and an average particle size of 3.7 μm. Then, 84 mg of the mixture was molded under pressure into a disk shape to prepare a positive electrode mixture molded body (positive electrode mixture layer) having a packing density of 5.35 g/cm$^3$ and a diameter of 6.4 mm.

<Assembly of Battery>

As the negative electrode, mercury-free zinc particles were used having an average particle size of 120 μm, with the proportion of the particles having a particle size of 75 μm or less being 10% by mass or less and the proportion of the particles having a particle size of 100 to 150 μm being 90% by mass or more, and containing 0.05% by mass (500 ppm) of In, 0.04% by mass (400 ppm) of Bi, and 0.001% by mass (10 ppm) of Al.

A gasket made of nylon 66 was attached to a sealing plate made of a three-layered clad plate of copper, stainless steel, and nickel. Then, 21 mg of the zinc particles were filled in the space inside, and 12 μL of an alkaline electrolyte solution in which potassium hydroxide and zinc oxide were dissolved in an aqueous solution at concentrations of 30.6% by mass and 4% by mass, respectively, was injected into the sealing plate to configure a negative electrode.

The internal capacity of the sealing plate in a state in which the gasket was attached thereto was 18 μL, and the ratio of the mass of the zinc particles to the internal capacity of the sealing plate was 1.17.

The same alkaline electrolyte solution as that described above was injected in an amount of 8 μL inside an outer can made of SUS430 having an inner diameter of 6.4 mm, and then the positive electrode was placed therein so that the side face and the bottom face of the positive electrode (positive electrode mixture layer) were brought into contact with the inner side face and the inner bottom face of the outer can, respectively. On the positive electrode, a laminate membrane ("YG 2152" manufactured by Yuasa Membrane Systems Co., Ltd.) including a 20-μm-thick cellophane film and a 30-μm-thick graft film composed of a graft copolymer obtained by graft copolymerization of acrylic acid with a polyethylene main chain, and 100-μm-thick vinylon-rayon mixed paper were placed so that the positive electrode and the mixed paper absorb the electrolyte solution. The sealing plate and the outer can were sealed with the gasket interposed therebetween to produce a button-shaped alkaline battery During assembly of the battery of Example 1, no leakage of the electrolyte solution was observed.

The amount of water in the battery container was 0.84 g per 1 g of the zinc particles of the negative electrode, and the positive electrode mixture layer accounted for 88% of the internal capacity of the outer can. Because the change in the internal capacity of the sealing plate before and after sealing was small, the ratio b/a of the mass of the filled zinc particles to the internal capacity of the sealing plate was set as 1.17.

Example 2

A button-shaped alkaline battery of Example 2 was produced in the same manner as in Example 1 except that the amount of the alkaline electrolyte solution injected inside the outer can was changed to 4 μL.

During assembly of the battery of Example 2, no leakage of the electrolyte solution was observed. The amount of water in the battery container was 0.67 g per 1 g of the zinc particles of the negative electrode.

Example 3

A button-shaped alkaline battery of Example 3 was produced in the same manner as in Example 1 except that the amount of the alkaline electrolyte solution injected inside the outer can was changed to 6 μL.

During assembly of the battery of Example 3, no leakage of the electrolyte solution was observed. The amount of water in the battery container was 0.76 g per 1 g of the zinc particles of the negative electrode.

Example 4

A button-shaped alkaline battery of Example 4 was produced in the same manner as in Example 1 except that the alkaline electrolyte solution was changed to 36% by mass of an aqueous solution of potassium hydroxide.

During assembly of the battery of Example 4, no leakage of the electrolyte solution was observed. The amount of water in the battery container was 0.86 g per 1 g of the zinc particles of the negative electrode.

Example 5

A positive electrode mixture molded body (positive electrode mixture layer) was formed in the following manner. A mixture was prepared by mixing 91.3 parts by mass of granulated silver(I) oxide having an average particle size of 150 μm and a bulk density of 2.4 g/cm$^3$ as a positive electrode active material, 1.9 parts by mass of acetylene black particles having a BET specific surface area of 68 m$^2$/g and an average particle size of primary particles of 35 nm, 3.8 parts by mass of graphite particles having a BET specific surface area of 20 m$^2$/g and an average particle size of 3.7 μm, and 3 parts by mass of $TeO_2$ powder. Then, 87 mg of the mixture was molded under pressure into a disk shape to prepare a positive electrode mixture molded body (positive electrode mixture layer) having a packing density of 5.35 g/cm$^3$ and a diameter of 6.4 mm. A button-shaped alkaline battery of Example 5 was produced in the same manner as in Example 1 except that the molded body thus prepared was used as the positive electrode.

During assembly of the battery of Example 5, no leakage of the electrolyte solution was observed. The amount of water in the battery container was 0.84 g per 1 g of the zinc particles of the negative electrode, and the positive electrode mixture layer accounted for 92% of the internal capacity of the outer can. The ratio b/a of the mass of the filled zinc particles to the internal capacity of the sealing plate was 1.17.

Comparative Example 1

A button-shaped alkaline battery of Comparative Example 1 was produced in the same manner as in Example 1 except that the amount of the alkaline electrolyte solution injected inside the outer can was changed to 2.5 μL.

During assembly of the battery of Comparative Example 1, no leakage of the electrolyte solution was observed. The amount of water in the battery container was 0.61 g per 1 g of the zinc particles of the negative electrode.

Comparative Example 2

A button-shaped alkaline battery of Comparative Example 2 was produced in the same manner as in Example 1 except that the amount of the alkaline electrolyte solution injected inside the outer can was changed to 10 μL, and the amount of the alkaline electrolyte solution injected to the negative electrode side was changed to 14.5 μL.

In Comparative Example 2, the leakage of the electrolyte solution was observed in about 80% of the assembled batteries. In the batteries without the leakage of the electrolyte solution, the amount of water in the battery container was 1.03 g per 1 g of the zinc particles of the negative electrode.

Comparative Example 3

A positive electrode mixture molded body (positive electrode mixture layer) was formed in the following manner. A mixture was prepared by mixing 94.3 parts by mass of granulated silver(I) oxide having an average particle size of 150 μm and a bulk density of 2.4 g/cm$^3$ as a positive electrode active material, and 5.7 parts by mass of graphite particles having a BET specific surface area of 20 m$^2$/g and an average particle size of 3.7 μm. Then, 91 mg of the mixture was molded under pressure into a disk shape to prepare a positive electrode mixture molded body (positive electrode mixture layer) having a packing density of 5.8 g/cm$^3$ and a diameter of 6.4 mm. A button-shaped alkaline battery of Comparative Example 3 was produced in the same manner as in Example 1 except that the molded body thus prepared was used as the positive electrode, and the amount of the alkaline electrolyte solution injected inside the outer can was 2 μL.

During assembly of the battery of Comparative Example 3, no leakage of the electrolyte solution was observed. The amount of water in the battery container was 0.61 g per 1 g of the zinc particles of the negative electrode, and the positive electrode mixture layer accounted for 88% of the internal capacity of the outer can. The ratio b/a of the mass of the filled zinc particles to the internal capacity of the sealing plate was 1.17.

Comparative Example 4

A button-shaped alkaline battery of Comparative Example 4 was produced in the same manner as in Comparative Example 3 except that the amount of the alkaline electrolyte solution injected inside the outer can was changed to 8 μL.

In Comparative Example 4, the leakage of the electrolyte solution was observed in about 60% of the assembled batteries. In the batteries without the leakage of the electrolyte solution, the amount of water in the battery container was 0.84 g per 1 g of the zinc particles of the negative electrode.

Table 1 shows the type and proportion of the conductive assistant contained in the positive electrode mixture layer, the amount of water in the batter container (per 1 g of zinc particles), and with or without assembly failure (the leakage of the electrolyte solution), regarding each of the batteries produced.

TABLE 1

| | Type and proportion of conductive assistant (% by mass) | Amount of water in battery container [per 1 g of zinc particles] (g) | Assembly failure no failure: good with failure: poor |
|---|---|---|---|
| Ex. 1 | carbon black: 1.9<br>graphite particles: 3.8 | 0.84 | good |
| Ex. 2 | carbon black: 1.9<br>graphite particles: 3.8 | 0.67 | good |
| Ex. 3 | carbon black: 1.9<br>graphite particles: 3.8 | 0.76 | good |
| Ex. 4 | carbon black: 1.9<br>graphite particles: 3.8 | 0.86 | good |
| Ex. 5 | carbon black: 1.9<br>graphite particles: 3.8 | 0.84 | good |
| Comp. Ex. 1 | carbon black: 1.9<br>graphite particles: 3.8 | 0.61 | good |
| Comp. Ex. 2 | carbon black: 1.9<br>graphite particles: 3.8 | 1.03 | poor |
| Comp. Ex. 3 | graphite particles: 5.7 | 0.61 | good |
| Comp. Ex. 4 | graphite particles: 5.7 | 0.84 | poor |

*Example: Ex., Comparative Example: Comp. Ex.

The batteries of Example 1 to 5 and Comparative Examples 1 and 3 without the leakage of the electrolyte solution during assembly were subjected to the following measurements.

<Internal Resistance of Battery>

The impedance of each battery was measured at 1 kHz according to an AC (alternating-current) impedance method, and the value measured was defined as the internal resistance of the battery.

<Discharge Capacity of Battery>

Each battery was discharged at a constant current of 0.05 mA at room temperature to measure the discharge capacity until the battery voltage dropped to 1 V.

<Load Characteristics of Battery>

Battery voltages (closed circuit voltage) of each battery discharged at constant currents of 20 mA and 80 mA at room temperature after a lapse of ten milliseconds from the start of discharging were measured to evaluate the load characteristics of the battery.

Table 2 shows the respective measurement results.

TABLE 2

| | Internal | Discharge | Load characteristics (V) | |
|---|---|---|---|---|
| | resistance (Ω) | capacity (MAh) | 20 mA | 80 mA |
| Ex. 1 | 7.2 | 16.1 | 1.36 | 1.07 |
| Ex. 2 | 8.0 | 16.0 | 1.32 | 1.03 |
| Ex. 3 | 7.5 | 16.2 | 1.33 | 1.04 |
| Ex. 4 | 8.8 | 16.1 | 1.32 | 1.04 |
| Ex. 5 | 5.2 | 17.0 | 1.41 | 1.14 |
| Comp. Ex. 1 | 10.8 | 15.9 | 1.23 | 0.81 |
| Comp. Ex. 3 | 19.2 | 19.8 | 1.20 | 0.11 |

*Example: Ex., Comparative Example: Comp. Ex.

The batteries of Examples 1 to 5 containing the carbon black and the graphite particles as the conductive assistant in the positive electrode mixture layer prevented the leakage of the electrolyte solution even when the amount of water in the battery container was in the range from 0.63 to 1 g per 1 g of the zinc particles of the negative electrode. Because of this, button-shaped alkaline batteries having excellent load characteristics and high reliability were configured.

On the other hand, the batteries of Comparative Examples 1 and 3 containing a lower amount of water than the range of the present invention in the battery container resulted in high internal resistance, which degraded the load characteristics. Particularly, the battery of Comparative Example 3 containing only the graphite particles as the conductive assistant of the positive electrode mixture layer degraded the properties more severely. On the other hand, the battery of Comparative Example 2 containing a higher amount of water than the range of the present invention in the battery container resulted in the leakage of the electrolyte solution in some batteries.

Moreover, the battery containing only the graphite particles as the conductive assistant of the positive electrode mixture layer was more likely to cause the leakage of the electrolyte solution during assembly of the battery, and the battery of Comparative Example 4 containing water in the battery container within the range of the present invention resulted in the leakage of the electrolyte solution in some batteries.

The invention may be embodied in other forms without departing from the essential characteristics thereof. The embodiments disclosed in this application are to be considered in respects as illustrative and not limitative. The scope of the invention is indicated by the appended claims rather than by the foregoing description, and all changes which come within the meaning and range of equivalency of the claims are intended to be embraced therein.

INDUSTRIAL APPLICABILITY

The button-shaped alkaline battery of the present invention has excellent load characteristics and reliability. By taking advantage of such properties, the button-shaped alkaline battery is favorably applicable to a wide range of uses, from medical measurement instruments that perform discharging at relatively high loads and are required to have high reliability to various applications to which conventionally known button-shaped alkaline batteries have been applied.

DESCRIPTION OF REFERENCE NUMERALS

1 Button-shaped alkaline battery
2 Outer can
3 Sealing plate
4 Positive electrode
5 Negative electrode.
6 Separator
7 Resin gasket

The invention claimed is:

1. A button-shaped alkaline battery, comprising:
a positive electrode comprising a positive electrode mixture layer comprising a silver oxide and a conductive assistant;
a negative electrode comprising zinc particles;
an alkaline electrolyte solution; and
a battery container for accommodating the positive electrode, the negative electrode, and the alkaline electrolyte solution, the battery container comprising an outer can, a sealing plate, and a resin gasket,
wherein the positive electrode mixture layer comprises carbon black and graphite particles as the conductive assistant, and
an amount of water in the battery container is 0.63 to 1 g per 1 g of the zinc particles of the negative electrode,
wherein the button-shaped alkaline battery satisfies a ratio b/a of 1 or more, where a (μL) represents an internal capacity of the sealing plate in a state in which the resin gasket is attached thereto, and b (mg) represents a mass of the zinc particles filled inside the sealing plate.

2. A button-shaped alkaline battery, comprising:
a positive electrode comprising a positive electrode mixture layer comprising a silver oxide and a conductive assistant;
a negative electrode comprising zinc particles;
an alkaline electrolyte solution; and
a battery container for accommodating the positive electrode, the negative electrode, and the alkaline electrolyte solution, the battery container comprising an outer can, a sealing plate, and a resin gasket,
wherein the positive electrode mixture layer comprises carbon black and graphite particles as the conductive assistant, and
an amount of water in the battery container is 0.63 to 1 g per 1 g of the zinc particles of the negative electrode,
wherein a volume of the positive electrode mixture layer accounts for 78% or more of an internal capacity of the outer can in the battery container.

* * * * *